March 15, 1938.   F. O'NEILL   2,111,296
GLASSWARE FORMING MACHINE
Filed Aug. 30, 1935   13 Sheets-Sheet 1

Fig. 1.

INVENTOR.
FRANK O'NEILL
BY Brown & Parham
ATTORNEYS.

March 15, 1938.   F. O'NEILL   2,111,296
GLASSWARE FORMING MACHINE
Filed Aug. 30, 1935   13 Sheets-Sheet 2

Fig. 2.

INVENTOR.
FRANK O'NEILL
BY *Brunner Parham*
ATTORNEYS

March 15, 1938. F. O'NEILL 2,111,296
GLASSWARE FORMING MACHINE
Filed Aug. 30, 1935 13 Sheets-Sheet 10

Fig. 18.

INVENTOR.
FRANK O'NEILL
BY Brown & Parham
ATTORNEYS

March 15, 1938.                F. O'NEILL                2,111,296
                       GLASSWARE FORMING MACHINE
                       Filed Aug. 30, 1935        13 Sheets-Sheet 11

INVENTOR.
FRANK O'NEILL
BY
ATTORNEYS

Patented Mar. 15, 1938

2,111,296

UNITED STATES PATENT OFFICE 2,111,296

GLASSWARE FORMING MACHINE

Frank O'Neill, Montreal, Quebec, Canada, assignor to Hartford-Empire Company, Hartford, Conn., a corporation of Delaware Application August 30, 1935, Serial No. 38,569

5 Claims. (Cl. 49—5)

The present invention relates to improvements in glassware forming machines of that type including blank and finishing mold tables arranged side by side for rotation about separate vertical axes. More particularly, the invention relates to continuously operating machines in which mold charges of molten glass are delivered to the blank molds from an automatic glass feeder.

An object of the present invention is the provision in a machine of the above character, of improved means for accelerating the charging operation and simultaneously therewith compacting the glass in the neck cavity and about the plunger. To this end, novel devices are provided for applying vacuum or suction to the neck end of the blank molds substantially at the time the glass enters the charging opening of the mold.

Another object of the present invention is the provision in a machine of the above character, of novel means for regulating and controlling the application of air under pressure to the blank molds during the period of compacting the glass and formation of an initial blow opening therein.

A further object of the present invention is the provision of novel supporting and locking means for the blank mold units, the locking means at least in part being operable to open the neck molds preparatory to and during transfer of blanks or parisons from one table to the other.

A still further object of the present invention is the provision of novel means for opening and closing the finishing molds whereby these molds may be securely held closed during final expansion of the blanks or parisons therein.

It is also an object of the present invention to provide novel means for directing mold charges to the charging opening of the blank molds. To this end, funnel guides are arranged on a carrier beneath the feeder and moved in synchronism with the blank molds and in such fashion that the guides travel a predetermined distance along the path of movement of and in register with the blank molds.

The present invention has for a further purpose, the general improvement and simplification of two-table bottle forming machines.

Other objects will be in part apparent and in part pointed out hereinafter.

In the drawings:

Figs. 19, 20 and 21 are sectional plan views showing successive positions of the mechanism for opening and closing one of the finishing molds. Fig. 19 shows the mechanism in position to apply the maximum closing pressure to the mold. Fig. 20 shows the mechanism in position to hold the mold closed, but without application of the extreme closing pressure. Fig. 21 shows the mechanism in position to hold the mold open.

Figs. 23 to 28, both inclusive, illustrate the adjustable means or distributor for controlling the application of blowing air to the finishing molds. Fig. 23 is a top plan view of the cap plate shown at the upper end of the central column in Fig. 18. Fig. 24 is a top plan view of the adjustable valve plate shown in Fig. 18. Fig. 25 is a sectional view taken substantially along the plane of line XXV—XXV of Fig. 24. Fig. 26 is a top plan view of the stationary distributor ring. Fig. 27 is a sectional view taken substantially along the line XXVII—XXVII of Fig. 26. Fig. 28 is a fragmentary top plan view of the rotary distributor ring.

In more or less general terms, the machine embodying my invention consists of a blank mold table 30 and a finishing mold table 31 arranged side by side upon a horizontal stationary base 32, said tables being suitably geared together and rotated continuously about separate vertical axes. Upon the blank mold table is arranged an annular series of blank mold units 33 to which mold charges of molten glass are delivered by gravity from a feeder F, these mold charges being transformed into blanks or parisons in the blank mold units and thereafter transferred to finishing mold units 34 which are arranged in an annular series upon the finishing mold table 31. In these finishing mold units the blanks or parisons are expanded to their final shape and at a predetermined position, are removed from said molds. Suitable guiding devices are interposed between the blank molds and feeder F for the purpose of directing the mold charges into the charging end of the molds. The blank mold units are provided with novel means whereby vacuum and air under pressure may be applied thereto in alternation during the blank forming cycle.

*Blank mold table*

More specifically, the blank mold table which is mounted for continuous rotation upon a vertical central column 35, comprises a lower spider 36, an upper spider 37 and an intermediate spider 38, which are suitably connected together so that they rotate as a unit about said central column. A ring gear 39 encircles and is integrally formed with the lower spider, said gear being operatively connected to driving mechanism as will be described hereinafter. The blank mold units 33 are mounted upon the intermediate spider 38 in such fashion that they may be rotated in intermittent steps, each of an angle of 180° and thereby alternately inverted and reinverted.

Figure 1:
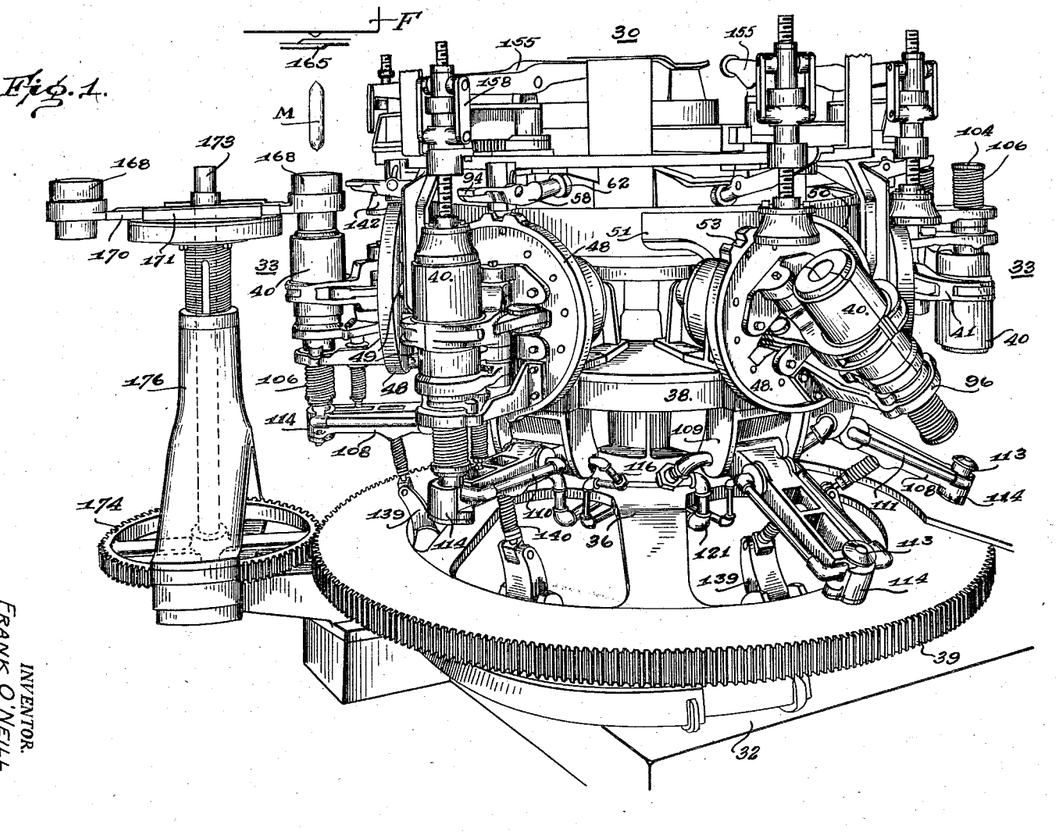
Fig. 1 is a detail perspective view of the blank mold table and funnel guides.
Figure 2:
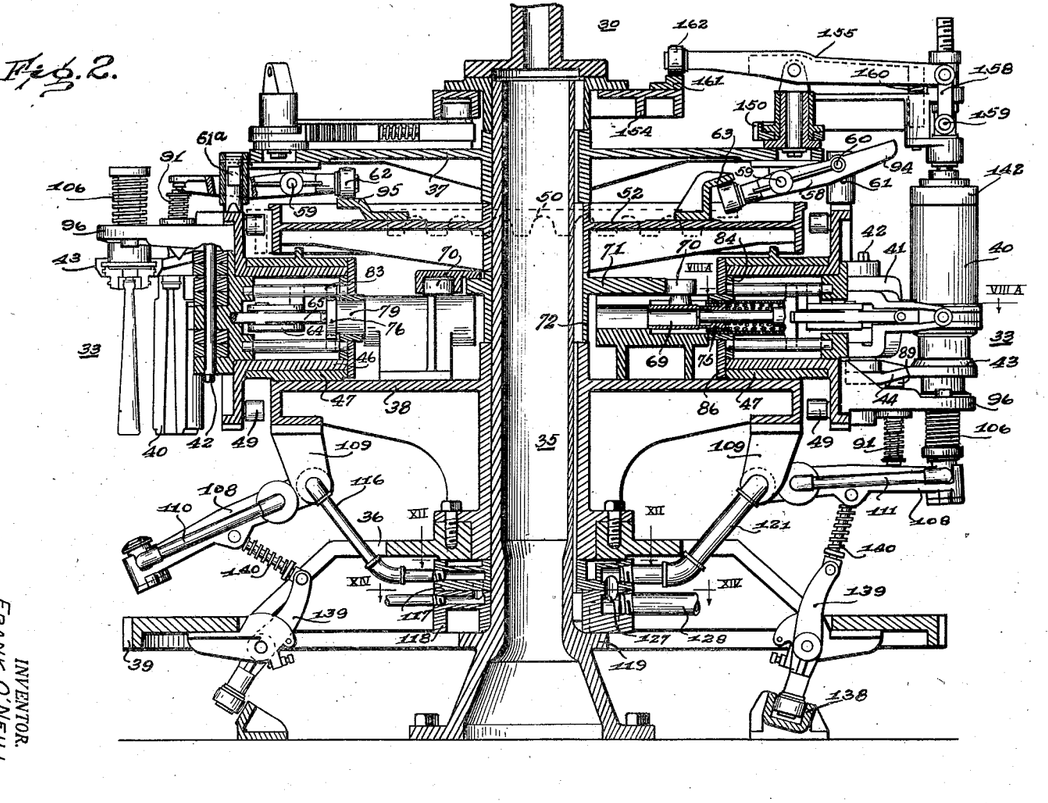
Fig. 2 is a vertical sectional elevational view through the blank mold table.

Each mold unit 33 includes a partible body mold 40 connected by arms 41 to a hinge pin 42 and a partible neck mold 43 which is carried by a pair of arms 44, the latter pivoted to the aforementioned hinge pin 42. This hinge pin 42 which forms part of a turnover unit, is permanently mounted on a head 45 which is connected to the outer end of a sleeve 46, the latter journaled in a horizontal bearing 47, the axis of which extends radially of the mold table. A circular flange 48 extending radially outward from the outer end of the sleeve 46 in proximity to the inner end of the head 45 carries an annular series of rollers 49 which are intended for engagement with notches 50 or recesses provided in the lower surface of an arcuate plate 51, said plate being suitably secured to a cam carrier 52. This cam carrier is keyed to the central column 35 (Fig. 2) and as will be apparent presently, supports cams for controlling opening and closing of the blank and neck molds as well as devices for locking the turnover units in either of their two operating positions.

The turnover unit is adapted to be locked in either of its two operating positions by means including a pair of diametrically opposed notches 53 or recesses in the periphery of the flange 48 and a detent 54 or plunger, which is mounted in a vertical guide 55 on the upper spider 37 and adapted for projection into the recesses 53, one at a time. A coil spring 56 disposed within the detent (which is of sleeve-like form) and bearing against a cross pin 57, in the upper end of the guide constantly exerts downward pressure on said detent. A lever 58 for retracting the detent is pivoted to a horizontal hinge pin 59 on the under side of the upper spider 37, said lever being connected near its outer end through cross pins 60 with said detent as hereinafter described. The pins 60 extend through opposed slots 61 in the side wall of the guide 55 and into grooves or flattened portions 61ª in the detent 54 as shown at the left in Fig. 2. A cam roll 62 is mounted upon the inner end of the lever 58 for engagement with a stationary cam 63 which is mounted upon the cam carrier 52, said cam being shaped to rock the lever and withdraw the detent from engagement with the recesses 53 preparatory to inverting or reverting the turnover unit. The arrangement is such that the pins 60 engage the upper ends of the grooves or flattened portions 61ª before reaching the upper ends of the slots 61 in the guide 55. Upward movement of the pins 60 will, therefore, serve to raise the detent 54 to permit inversion of the associated blank forming unit.

Figures 3, 4:
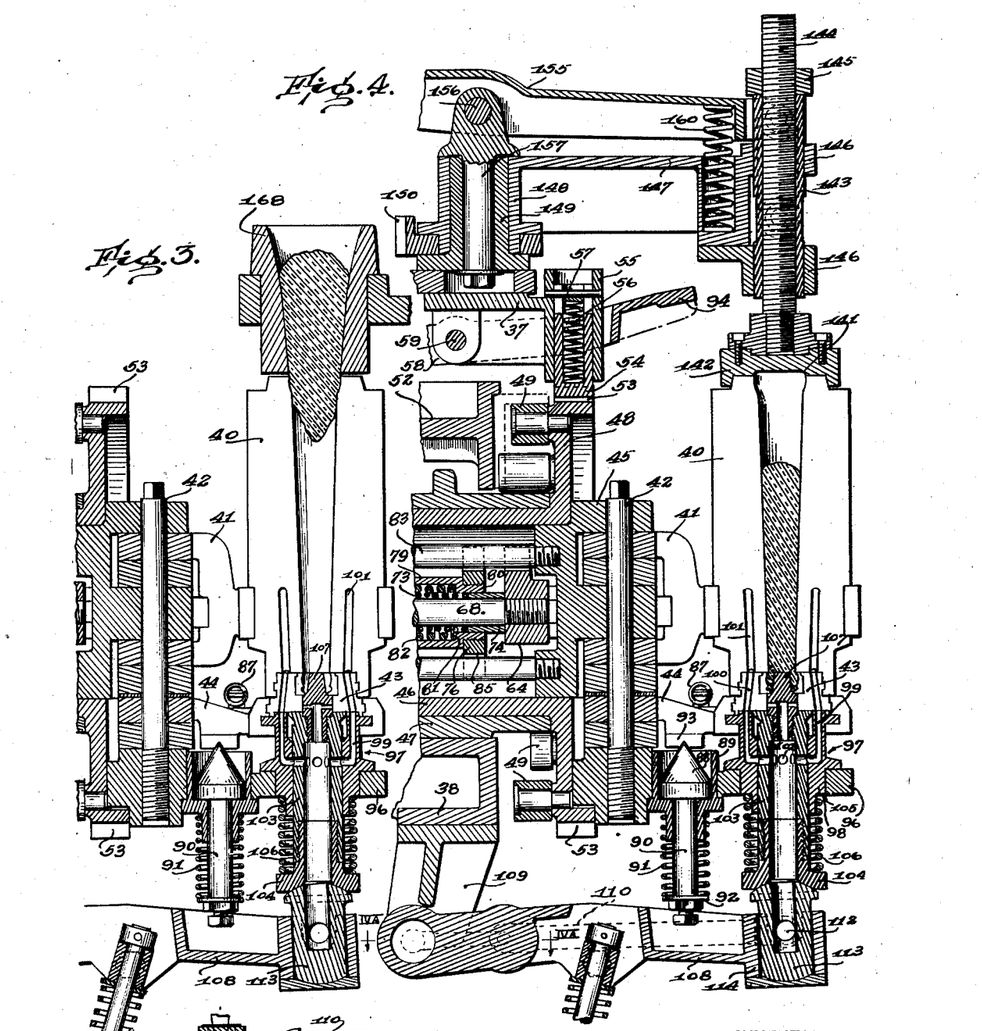
Fig. 3 is a fragmentary detail sectional view with parts in elevation showing a blank mold at the charging position and a mold charge of molten glass just entering the mold.
Fig. 4 is a fragmentary sectional view of a blank mold unit showing the mold charge therein and the finish or neck end completely formed.
Figure 4A:
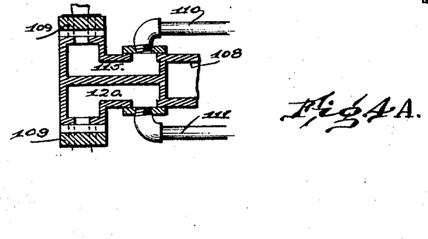
Fig. 4A is a sectional view taken along the line IVA—IVA of Fig. 4.
Figure 8A:
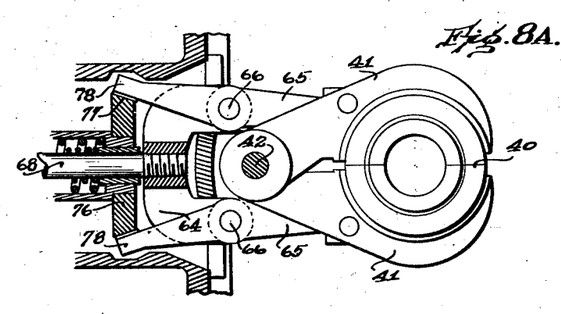
Fig. 8A is a sectional elevational view taken substantially along the line VIIIA—VIIIA of Fig. 2.
Figures 9, 10, 11:
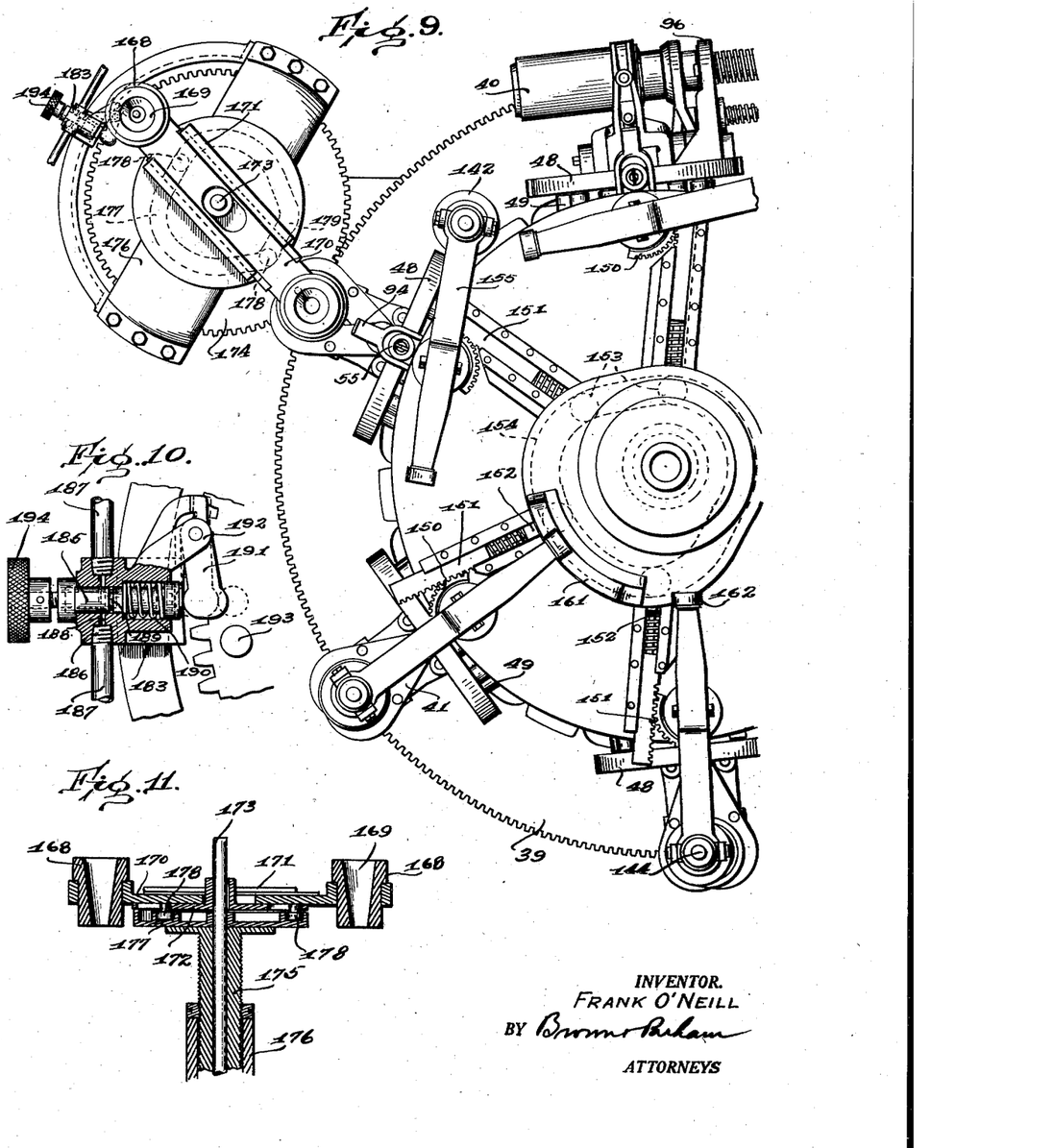
Fig. 9 is a fragmentary plan view of the blank mold table showing the funnel guide device in connection therewith.
Fig. 10 is a sectional plan view of the regulating device through which the bottle machine controls operation of the glass feeder.
Fig. 11 is a fragmentary vertical sectional view through the funnel guide device.

The body blank mold 40 is opened and closed independently of the neck mold by mechanism (Figs. 2 and 8A) which for the greater part is disposed within the sleeve 46. This mechanism includes a yoke 64 spaced inwardly from the corresponding blank mold and connected to the body mold sections by means of levers 65 which are pivoted substantially midway their length to the ends of said yoke through vertical hinge pins 66. The outer end of each lever is pivoted to the adjacent mold arm 41. A push rod 68 is threaded into or otherwise secured to the yoke 64, said rod extending axially through the sleeve 46 and being slidingly connected at its inner end to a slide block 69 which carries a cam roll 70 operatively engaged with a stationary cam 71, the latter carried by a hub 72 keyed to the central column 35. A coil spring 73 (Figs. 2, 4, and 8A) encircling the rod 68 and bearing at its outer end against a collar 74 and at its inner end against a sleeve-like extension 75 on the slide block 69 yieldingly holds the yoke 64 and slide block 69 in their maximum spaced relation and provides operating connection between them. Arranged in proximity to the inner side of the yoke 64 is a spreader 76 which is mounted for sliding movement in the direction of the length of the rod 68 and operates to impart additional mold closing pressure to the levers 65. This is accomplished by providing for engagement between cam surfaces 77 on the spreader 76 and similar surfaces on the inward extensions 78 of the levers. This spreader is suitably secured to the outer end of a sleeve 79 which partially encloses the push rod 68 and completely encloses the coil spring 73, this sleeve telescoping over the tubular extension 75 on the slide block 69. The outer end 80 of the sleeve 79 is reduced in diameter to provide an annular shoulder 81 against which a coil spring 82 abuts, the opposite end of the spring engaging the adjacent or outer end of the tubular extension 75. Thus, it will be seen that radial outward movement of the cam roller 70 operates through the two coil springs 73 and 82 and the yoke 64 and levers 65 to close the body blank mold, and that after a predetermined extent of movement on the part of the yoke 64, the spreader 76 begins to function and by applying added closing pressure to the arms 41 serves to securely hold the body blank mold against premature opening. Guide rods 83 connect the head 45 and a plate 84 which is secured to the inner end of the sleeve 46, said rods extending through diametrically opposed recesses 85 in the periphery of the spreader 76, whereby inversion and reversion of the blank mold unit correspondingly moves the push rod 68 and other elements associated therewith excepting only the slide block 69 and cam roll 70. A plate 86 closes the inner end of the bearing 47.

The neck mold 43 is normally held closed by means of a coil spring 87 which connects the arms 44. Opening of this mold at regular time intervals is obtained by means of a tapered pin 88 which is mounted in a guide 89 and carries a push rod 90, the latter being encircled by a coil expansion spring 91. This spring bears against a washer 92 and normally holds the pin in an inoperative position. This tapered pin during opening of a mold, engages opposed surfaces 93 on the neck mold arms, being brought into engagement therewith by an extension 94 on the lever 58. Each lever is rocked about its pivot pin 59 by means of a cam 95 which is shaped to initially move the tapered pin only a short distance and immediately thereafter complete the downward movement of said pin. Thus, the neck mold is opened slightly at the beginning of the blank transferring operation and at the proper time during said operation is opened completely to release the blank or parison to the control of the corresponding finishing mold as will appear hereinafter. Downward movement of the outer end 94 of each lever 58 subsequent to the seating of the detent 54 is permitted by the flattened portions 61ª of the detent, the pins 60 of the lever 58 moving downwardly in the slots 61 and over the flattened portions 61ª during the opening of the associated neck ring. A bracket 96 extending radially outward from the head 45 supports the tapered pin 88 and in addition, carries a plunger unit 97.

Figures 5, 6:
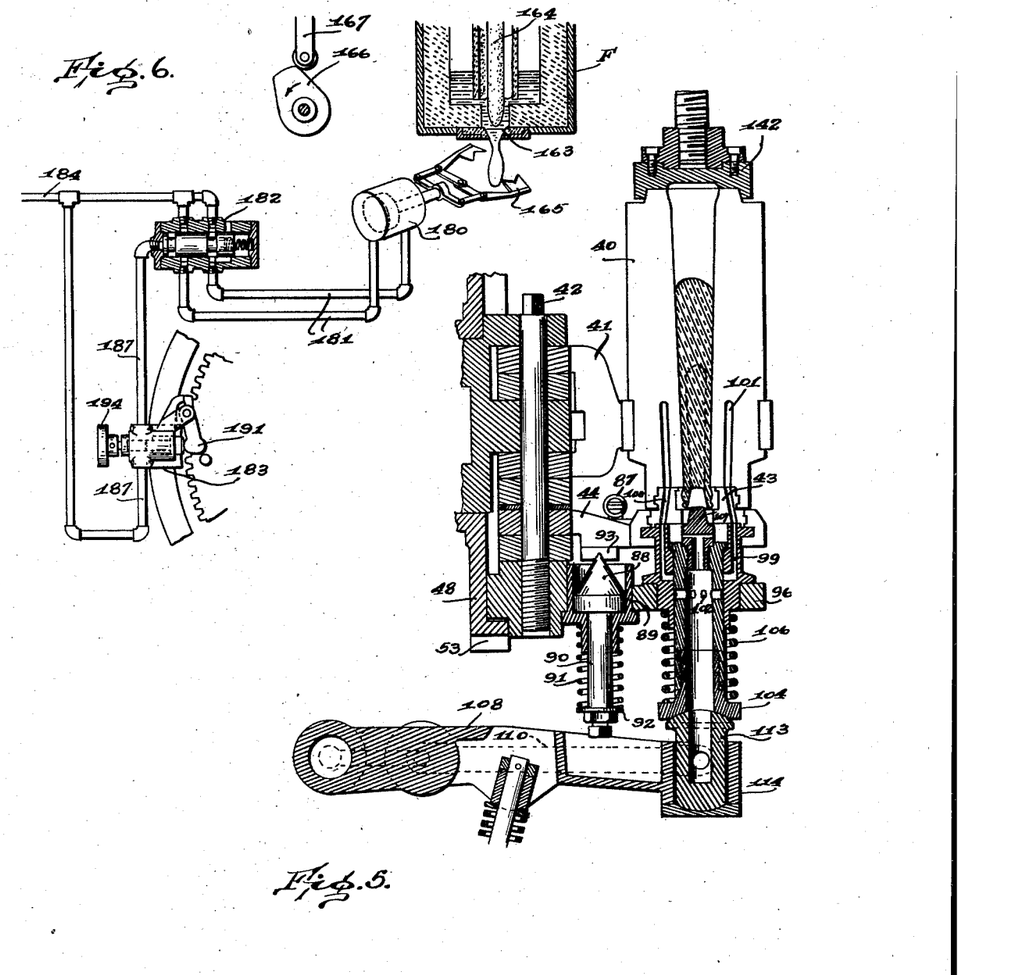
Fig. 5 is a view somewhat similar to Fig. 4 showing the plunger withdrawn preparatory to the introduction of air under pressure to expand the glass in the blank mold.
Fig. 6 is a view illustrating the mechanism for synchronizing the feeder and machine operations.

This plunger unit 97 includes an outer vertical sleeve 98 fitted into an opening in the bracket 96, said sleeve having conduits 99 therein in register with conduits 100 and 101 in the neck and body blank molds respectively. Normally the bottom end of the conduits 99 in said sleeve register with ports 102 in a plunger holder 103 which is slidingly disposed within the sleeve and extends below the lower end thereof, said tube having a flange 104 at its lower end designed to cooperate with a shoulder 105 in confining and supporting a coil expansion spring 106. The function of this spring is to retract the hollow plunger holder 103 with respect to the sleeve 98 and the neck ring 43 when such action is permitted by the means hereinafter to be described. At the position of the parts shown in Figs. 3 and 4, vacuum may be applied to the grooves 101 of the mold 40 through passages 102, 99 and 100; while in the position shown in Fig. 5, pressure may be applied for counterblowing the glass as hereinafter described. A plunger 107 or mouth-forming pin is separably connected to the inner end of the plunger holder 103 and is adapted to cooperate with the neck mold 43 in shaping the neck end of the blanks or parisons and further to create the customary initial blow opening in the blank.

The application of vacuum or air under pressure to each of the blank mold units is obtained by means of conduits which are carried by a pivoted vertically swinging arm 108. This arm is pivoted to a bracket 109 depending from the intermediate spider 38 and is moved about its pivot in a fashion to be described hereinafter.

An air pressure supply pipe 110 extends along one side of the arm 108 and a vacuum pipe 111 is arranged along the opposite side thereof. Both pipes communicate at the outer end of the arm 108 by way of opposed ports 112 with an upstanding sleeve 113, the latter being disposed in a holder 114 and extending thereabove for sealing engagement with the lower flanged end of the plunger holder 103. The opposite end of the air supply pipe 110 communicates by way of a passageway 115 in the inner end of the arm 108 with a pipe 116 leading to a rotary distributor ring 117, the latter encircling the column 35 immediately below the lower spider 36 and designed for rotation upon said column and cooperation with a stationary distributor ring 118 which is interposed between the rotary ring and a flange 119 adjacent the lower end of the column 35. The vacuum pipe 111 disposed alongside of the arm 108, communicates at its inner end with a passageway 120 in the arm, said passageway being connected by means of a pipe 121 or conduit with the rotary distributor ring 117 just mentioned.

Figures 12, 13, 14, 15:
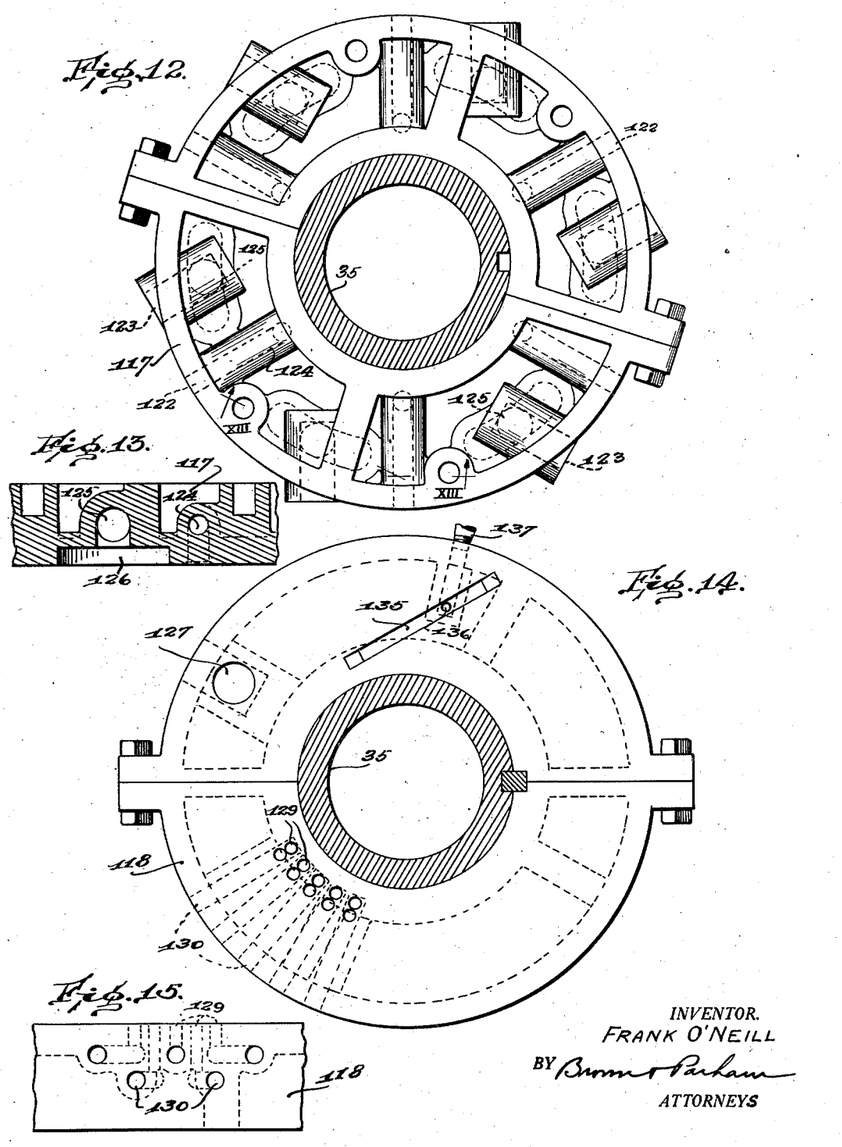
Fig. 12 is a sectional plan view taken substantially along the line XII—XII of Fig. 2.
Fig. 13 is a sectional view taken substantially along the line XIII—XIII of Fig. 12.
Fig. 14 is a sectional plan view taken substantially along the line XIV—XIV of Fig. 2.
Fig. 15 is a fragmentary side elevational view of the element shown in Fig. 14.

Air and vacuum ports 122 and 123 respectively are arranged in pairs about the periphery of the rotary distributor ring 117, these ports opening into substantially L-shaped air and vacuum conduits 124 and 125 respectively. These conduits open through the lower surface of the distributor ring 117. It will be observed in Figs. 12 and 13 that the inner end of the air conduit 124 is nearer the center of the distributor ring than the corresponding end of the vacuum conduit 125 and that the vacuum conduit opens into an arcuate channel 126 formed in the lower surface of said ring. During a portion of each complete revolution of a head or mold unit about the central column 35, the channel 126 moves over and in register with a vacuum port 127 in the stationary distributor ring 118 which port is directly connected to a vacuum pipe 128 leading to a vacuum pump or chamber (not shown). Thus, vacuum is applied to the blank mold a predetermined period of time during each cycle of operations.

The corresponding air conduit 124, which, as stated heretofore, opens through the lower side of the rotary distributor ring 117, is adapted for register during each cycle of operations with a series of upwardly opening ports 129 in said stationary distributor ring 118, said ports forming portions of passageways 130 extending radially of the ring 118 and connected to a group of air pressure supply pipes 131. These pipes 131 lead to a header 132 to which they are connected by means of valves 133. The header is connected in turn to a supply pipe 134 which leads to a source of air pressure supply (not shown). The valves 133 provide means whereby the duration of the time of applying air under pressure to the blank molds may be varied to meet the specific requirements of any particular operation. Lubrication of the contacting bearing surfaces of the rotary and stationary distributing rings 117 and 118 is obtained by forming an oil groove 135 in the upper side of the stationary ring 118 and connecting it by means of a feed opening 136 and supply pipe 137 to any suitable source of supply of lubricant (not shown).

Each of the arms 108 performs the two-fold function of establishing communication between the pipes 110, 111 and the tubular plunger holder 103 leading to the mold cavity and controlling the position of the plunger 107 or mouth-forming pin with respect to the blank mold. It is evident that the coil spring 106, in the absence of contact between the arm 108 and sleeve 103, retracts or withdraws the plunger 107 from its operative position in the neck mold. Thus, it is seen that the position of the arm 108 directly determines the location of the plunger 107. Movement of the arm 108 is obtained by a stationary cam 138 which operates through a bell crank lever 139 and a yielding link connection 140. The cam is of such shape that during a portion of each cycle of operations, it projects the arm upwardly sufficiently to align the ports 102 and conduits 99 (Fig. 4) during and for a short time following the charging operation and shortly thereafter lowers the arm sufficiently to permit the spring 106 to withdraw the plunger 107 from its operative position in the neck mold and disalign said ports 102 and conduits 99, the latter being effected preparatory to the introduction of air under pressure into the mold. Prior to the application of air under pressure to the neck end of the blank mold, the charging opening 141 is closed by means of a baffle plate 142.

This baffle plate 142 is carried by mechanism, through the operation of which it may be shifted horizontally and moved vertically relative to the mold. This mechanism includes a holder 143 into which a threaded rod 144 carried by the baffle plate 142 is fitted. A lock nut 145 at the upper end of the holder serves to secure the rod and plate against accidental movement in said holder. The holder is slidingly supported in a pair of vertically aligned guides 146 at the outer end of a horizontal arm 147, said arm carrying at its inner end, a vertical hub 148 mounted for oscillation upon an upstanding bearing 149 or trunnion which is suitably secured to the upper spider 37. A sector gear 150 is attached to the lower end of the hub 148 and meshes with a rack bar 151, the latter carried by a horizontal slide 152 which at its inner end is connected to a cam roll 153 running in a stationary cam 154. This cam 154 encircles the central column and is of such shape that it swings the arm 147 and baffle plate 142 between an operative position over and in register with the corresponding blank mold and an inoperative position to one side thereof.

Vertical movement of the holder 143 in the guides 146 for the purpose of moving the baffle plate 142 into and out of contact with the blank mold, is obtained by mechanism including a horizontal arm 155 pivoted to a hinge pin 156 provided at the upper end of a vertical stub shaft 157 extending through the bearing 149, said arm or lever 155 being connected at its outer end through links 158 and bolts 159 to the holder. A coil spring 160 interposed between the horizontal arm 147 and the lever 155, normally tends to move the holder and baffle plate upwardly away from the blank mold. A cam 161 engaging a cam roll 162 at the inner end of the lever 155, operates in opposition to the spring to bring the baffle plate into engagement with the blank mold at regular time intervals following alignment of the plate and mold.

*Charge feeding mechanism*

As brought out heretofore, mold charges of molten glass are obtained from a feeder F of conventional or any preferred form. The glass issues through a bottom outlet opening 163 under the influence of gravity and a reciprocating plunger 164. Retraction of the plunger at the proper time constricts the issuing stream of glass in proximity to the outlet opening 163. Thereupon shears 165 or other charge severing means, separate the suspended mass of glass from the supply body. The plunger 164 may be reciprocated by means (not shown) actuated by a continuously rotating cam 166 and a push rod 167 associated therewith. The mold charge M after it has been severed from the supply body, drops vertically downward into the charging opening of the blank mold, being guided to the latter by means of one of a pair of funnel guides 168. These funnel guides are nothing more nor less than vertical sleeves having downwardly tapered passageways 169 therethrough which are held in register with the charging opening of the blank molds for a short period of time in and during movement of the molds through the charging zone. These funnel guides are mounted at the opposite ends of a horizontal slide 170 which in turn is supported in a slideway 171, the latter provided on the upper side of a rotary disk 172. This disk is splined to the upper end of a vertical shaft 173 which at its lower end is connected to a gear 174 running in mesh with and driven by the ring gear 39 on the blank mold table. An externally threaded sleeve 175 is mounted for vertical adjustment in the pedestal 176 and at its upper end carries a cam 177 in which rollers 178 on the slide 170 run. This cam includes a reentrant portion 179 which is concentric with the path of travel of the blank molds in the charging zone and functions to cause the funnel guides to move in register with the molds during the charging operation.

Operation of the shears and funnel guides is directly controlled by the machine proper. The mechanism providing such control includes in addition to the direct gear drive from the blank mold table to the gear 174 for rotating the funnel guides, an air operated piston type motor 180 for actuating the shears, air being supplied to the opposite ends of the motor in alternation through pipes 181 which are connected through a spool valve 182 and trip valve 183 to an air pressure supply pipe 184, the latter in turn leading to any suitable source of air pressure supply (not shown). The spool valve is of conventional form and is not believed to require any detailed description. The trip valve which controls the flow of air under pressure from the main supply line 184 to actuate the spool valve 182, includes a reciprocating plunger 185 arranged in a housing 186, said housing having air pipes 187 connected thereto at diametrically opposite points and communicating with the plunger opening by way of ports 188. The plunger 185 is formed with an annular channel or groove 189 which when properly positioned, establishes communication between ports 188 and therefore the pipes 187, so that air under pressure is supplied to the spool valve 182 and effects a reversal of its operating position. The plunger 185 is yieldingly held in an inoperative position by a coil spring 190. A trip arm 191 pivoted to a bracket 192 on the inner end of the housing 186 is moved periodically by means of properly located pins 193 on the gear 174 to move the plunger to its operative position. An adjusting device 194 is employed to regulably control the position of the plunger 185 to thereby insure alignment of the annular channel 189 and the ports 188 upon completion of the outward travel of the plunger.

In view of the above, it will be understood that a complete blank or parison forming cycle includes delivery of a mold charge M to a blank mold by way of one of the funnel guides 168. Vacuum or suction is applied to the blank mold by way of the tubular plunger holder 103 to thereby accelerate settling of the mold charge in the neck end of the mold and to insure complete filling of the neck mold. Immediately upon shutting off the vacuum, the arm 108 is lowered a short distance to thereby retract or withdraw the plunger 107. Thereupon a puff of air under pressure is introduced into the initial blow opening which was created by the plunger. Thus, the mold charge is expanded to the shape of the blank mold preparatory to transfer of the blank or parison to the finishing mold. Prior to arrival at the transfer zone between the two mold tables, the baffle plate 142 is moved out of engagement with the blank mold, the latter then being inverted to place the blank or parison in a normal upright position. Prior to arrival at the transfer point, the body blank mold 40 is opened. This leaves the blank or parison supported in its entirety by the neck mold which is opened slightly by the tapered pin 88 a few degrees in advance of the transfer point. The extension 94 on the arm 58 actuates the pin 88 for the purpose of opening the neck mold. Substantially at the time the finishing mold 34 is completely closed about the blank B or parison, the neck mold is completely opened. This leaves the blank entirely supported by and within the finishing mold.

Finishing mold table

The finishing mold units 34 are arranged in an annular series upon the finishing mold table 31, the latter including a stationary central column 195 rising from a pedestal 196 and supporting the mold carriage 197 which consists of a lower spider 198, an intermediate spider 199 and an upper spider 200, these spiders being suitably secured together for rotation as a unit about the central column. A ring gear 201 forming a part of the lower spider 198 runs in mesh with and is driven by the ring gear 39 on the blank mold table.

Each of the finishing mold units 34 includes a partible finishing mold 202 resting upon a bottom plate holder 203 and connected through arms 204 to a vertical hinge pin 205. This mold together with the bottom plate holder 203 and hinge pin 205 are mounted upon a vertically adjustable carrier 206 which more or less assumes the form of a slide mounted in a vertical slideway 207, said carrier including a threaded rod 208 actuated by a hand wheel 209 and functioning to move said finishing mold, bottom plate holder, etc., vertically relative to the intermediate spider 199 upon which the mold opening and closing mechanism is mounted.

This mold opening and closing mechanism (Figs. 18 to 21, both inclusive) includes a pair of levers 210 connected through links 211 to the mold sections, said levers being pivoted through vertical hinge pins 212 to a yoke 213 which is directly connected to a push rod 214. This push rod is slidingly connected to a slide block 215 which carries a cam roll 216 adapted for engagement with a cam 217. A coil spring 218 is interposed between the slide block and yoke 213, said spring encircling the rod 214 and operating to yieldingly hold the yoke and slide block in their maximum spaced relation, and providing yielding operating connection therebetween. A sleeve 219 surrounding a portion of the push rod 214 and the spring 218, carries a spreader 220 designed for operative engagement with extensions 221 on the levers 210. This spreader is formed with cam faces 222 on its periphery for engagement with said extensions 221. A coil spring 223 encircling the coil spring 218 and enclosed by the sleeve 219, bears against the outer end of a tubular extension 224 on the slide block 215 and an internal shoulder 225 at the outer end of said sleeve 219. Through this spring, the slide block operates to force the spreader 220 into engagement with the extensions 221 on the levers 210. Guide rods 226 mounted in upstanding brackets 227 on the intermediate table 199, slidingly support the block 215, yoke 213 and spreader 220 against movement about the axis of the push rod 214.

The bottom plate holder 203 is pivoted to a horizontal hinge pin 228, said holder carrying a bottom plate 229 and connected through toggle links 230 to a connector rod 231 which is pivoted to a lever 232. This lever is pivoted upon a horizontal hinge pin 232 carried by the lower spider 198 and carries a cam roll 234 running in a continuous stationary cam 235 by means of which the position of the bottom plate may be regulably controlled.

Figure 16:
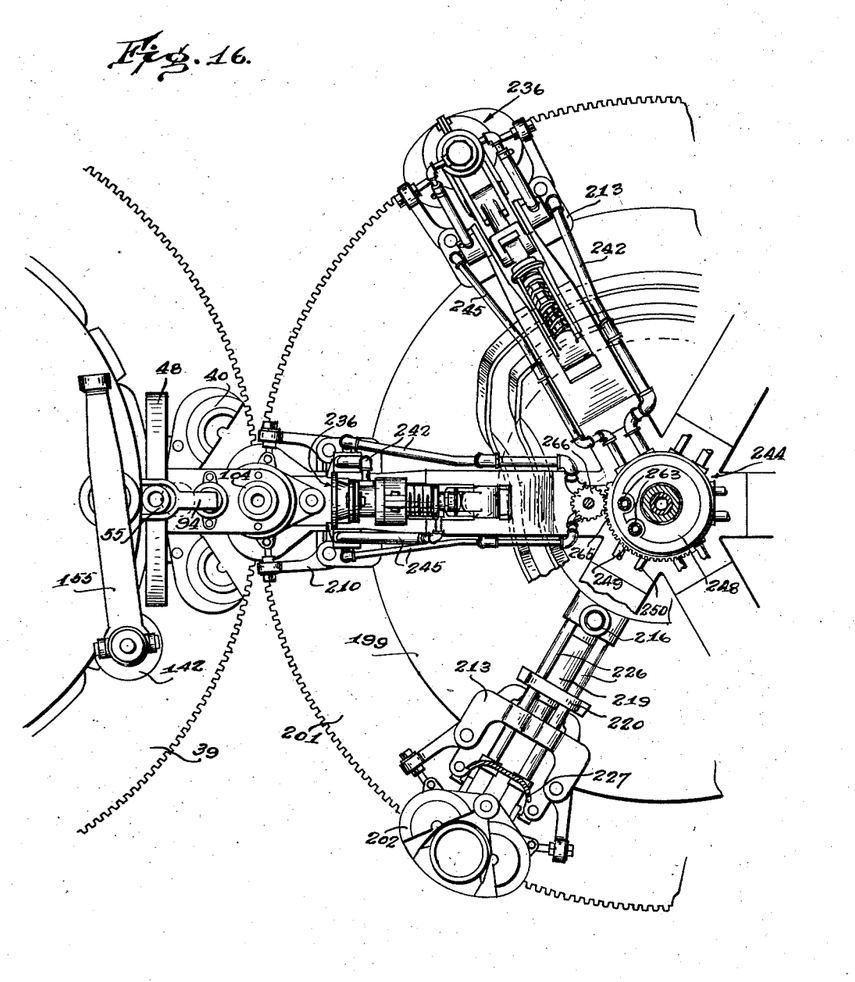
Fig. 16 is a fragmentary plan view of the finishing mold table showing one mold at the blank transferring position for cooperation with one of the blank mold units.
Figure 17:
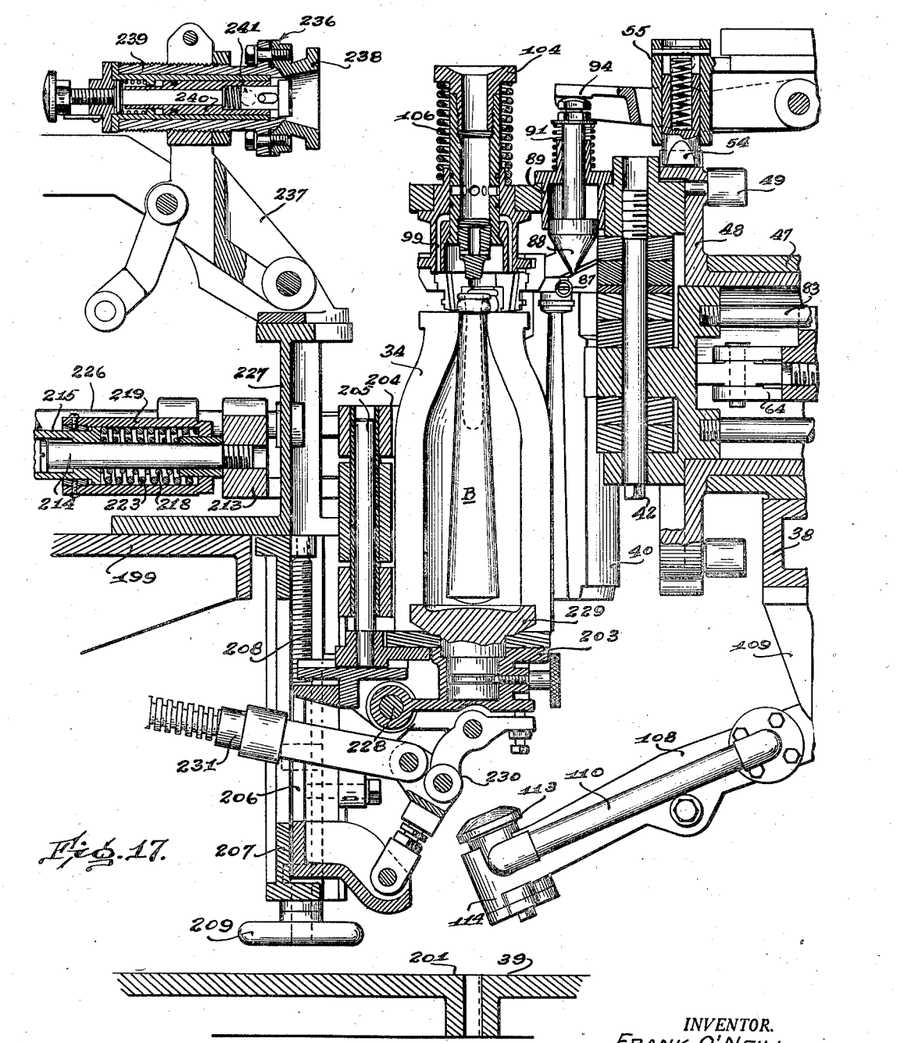
Fig. 17 is a detail vertical sectional elevational view of a pair of blank and finishing molds at the blank transferring position.
Figure 18:
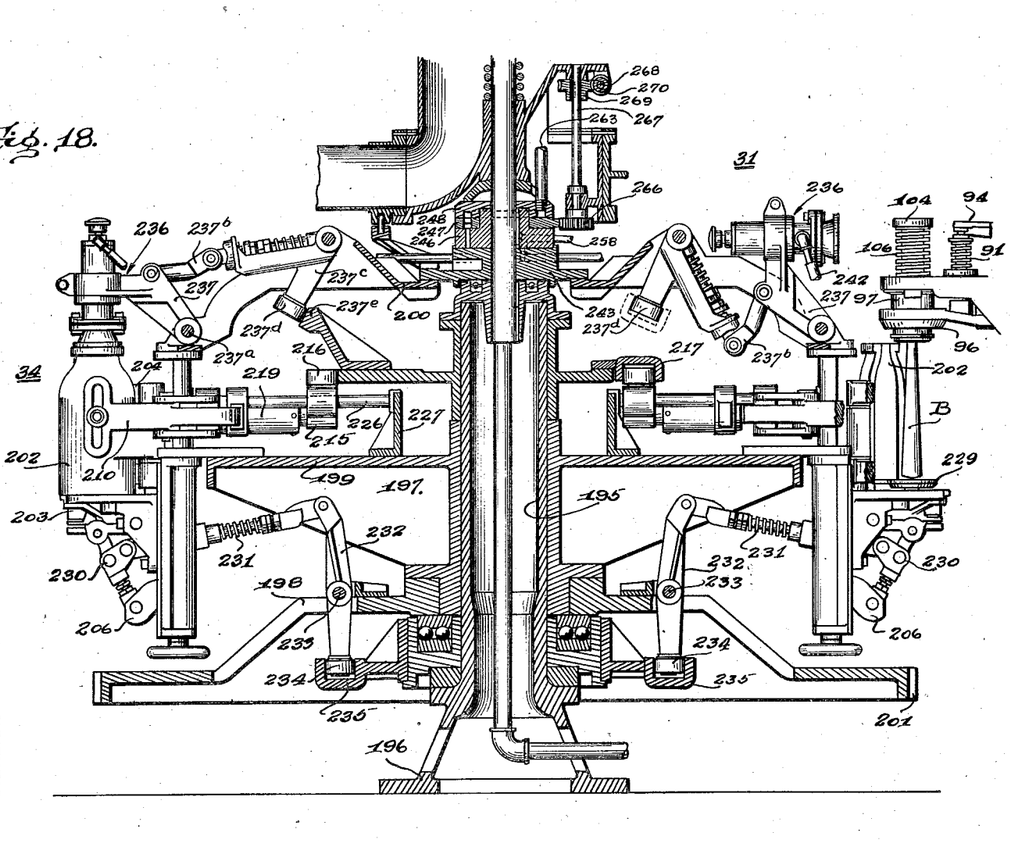
Fig. 18 is a vertical sectional view through the finishing mold table, parts being shown in elevation.
Figure 19:
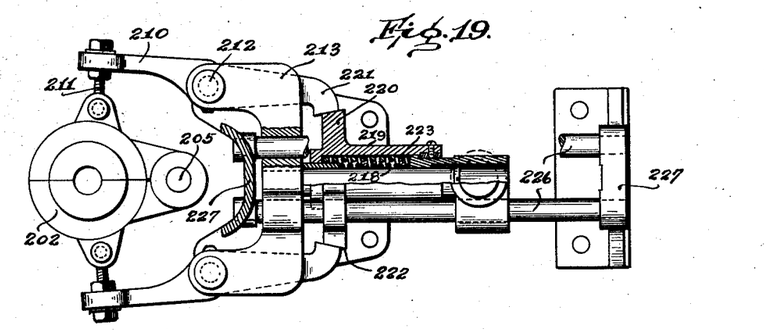
Figure 20:
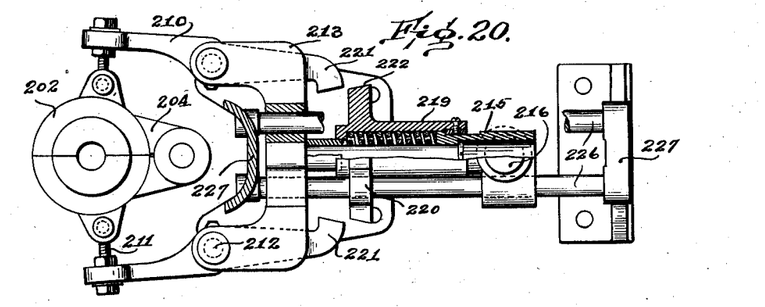
Figure 21:
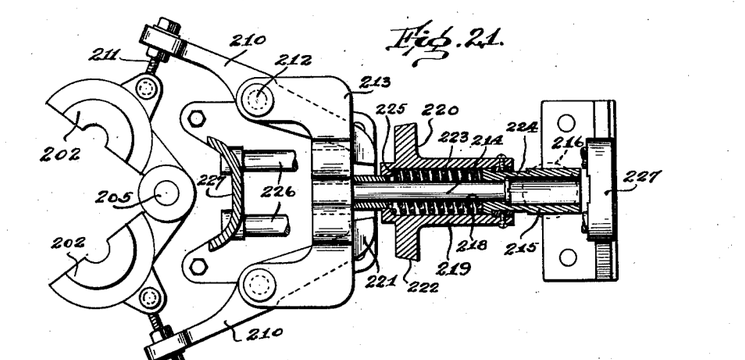
Figure 22:
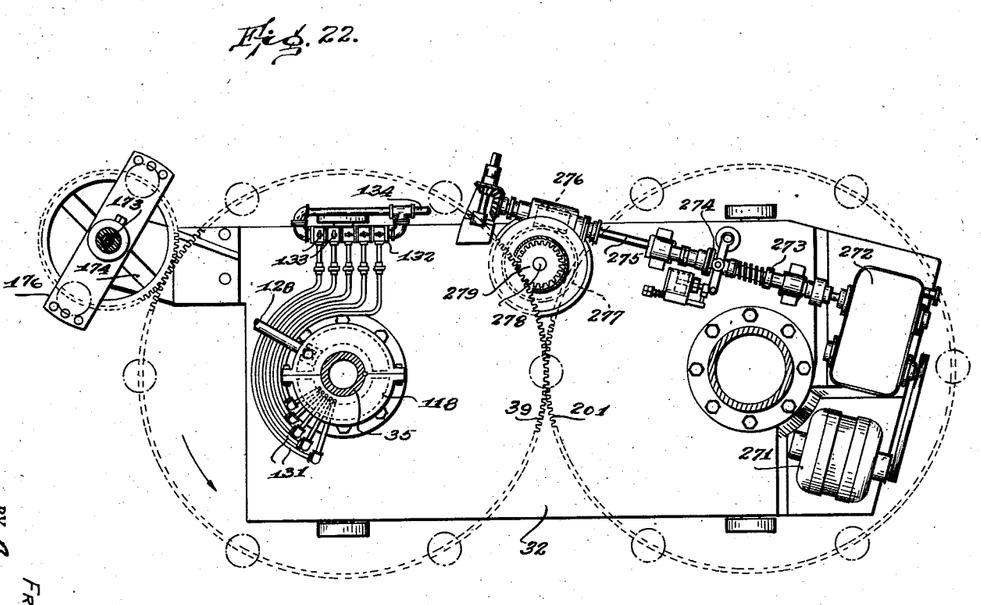
Fig. 22 is a sectional plan view of the base showing the driving mechanism and a part of the pipe system for conducting air under pressure to the blank molds.
Figures 23, 24, 25:
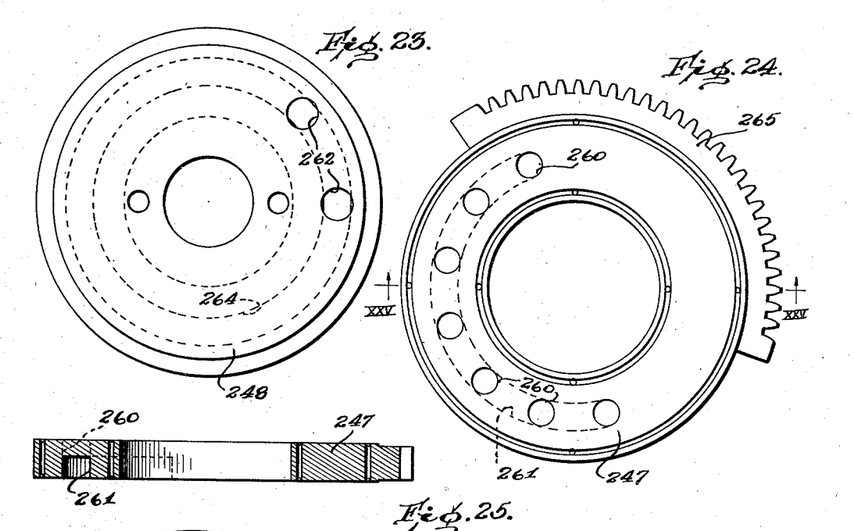
Figures 26, 27, 28:
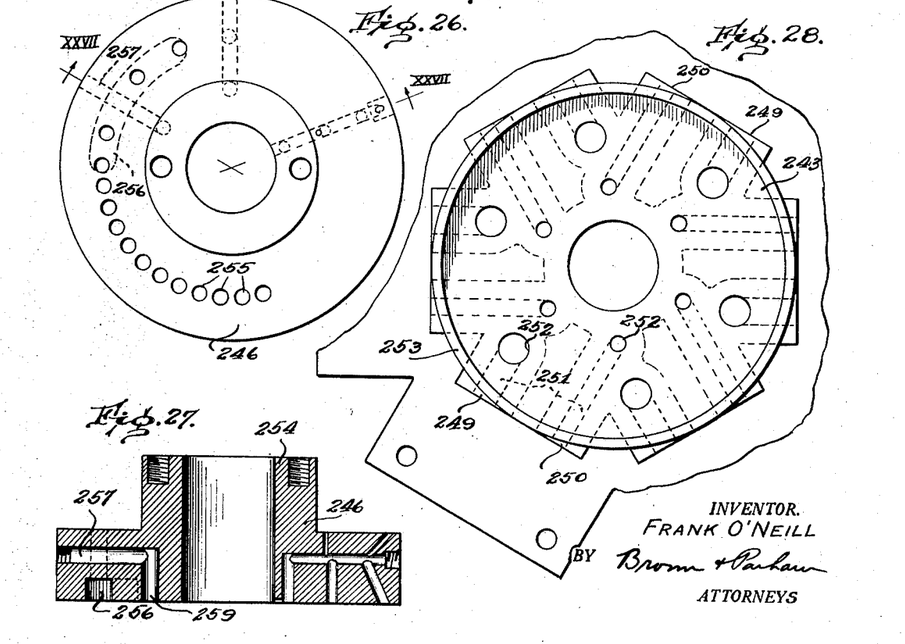

Each finishing mold unit 34 is provided with a blow head 236 (Figs. 16, 17 and 18). This blowhead which is carried by a holder 237, is almost identical in construction to the blow-head in Figs. 31 and 33 of my Patent #1,981,244 dated November 30, 1934, and differs therefrom only in matters of more or less unimportant details. The holder 237 for the blow-head is pivoted to a horizontal hinge pin 237a and connected through a link 237b to a bell crank lever 237c. This lever carries a cam roll 237d running upon a cam 237e which is shaped to raise and lower the blow-head at regular time intervals.

The blow-head broadly consists of a sleeve 238 adapted to rest upon the upper end of the finishing mold 202, said sleeve being loosely connected to the lower end of a tube 239 within which is arranged a valve member 240 designed for actuation by engagement with the neck end of the blank or parison B. The blowing air under pressure enters the blow-head by way of a port 241 which is connected to a flexible pipe 242 leading radially inward to a rotary air distributing ring 243 which is mounted upon the upper end of the stationary column 195 and constitutes part of a distributor 244. Another pipe 245 connects the distributing ring 243 with the upper end of the blow-head and normally conducts air to the latter for the purpose of moving the valve member downwardly therein into engagement with a finished bottle during initial opening of the mold. These pipes 242 and 245 are arranged in pairs individual to the finishing mold units 34.

This air distributor 244 (Figs. 18 and 23 to 28, both inclusive) includes in addition to the rotary distributor ring 243, a stationary distributor ring 246, an adjustable valve plate 247 and a cap plate 248. The rotary distributor ring 243 is provided with an annular series of pairs of radially extending ports, one port 249 of each pair being connected to one of the pipes 242, while the other port 250 is connected to one of the pipes 245. These ports 249 and 250 open into substantially L-shaped conduits 251 leading to upwardly facing ports 252 which open through the upper surface of the ring 243. The stationary distributor ring 246 is mounted upon the rotary ring 243 within an upstanding marginal flange 253, said stationary ring including an upstanding hub 254 which is encircled by the adjustable valve plate 247 and cap plate 248.

The stationary ring 246 is provided with a series of vertical ports 255 adapted for alignment with the outermost annular series of ports 252 (Fig. 28) during the time the latter move through a predetermined zone. The ports 255 in the stationary ring 246 are for the greater part grouped close together in order to provide for regulable control of the beginning and duration of the final blowing operation as will be apparent presently. At one end the series of vertical ports 255 are spaced apart a considerable distance and open into an arcuate channel 256 in the lower side of said stationary ring. A conduit 257 (Figs. 26 and 27) is connected to a pipe 258 leading to a source of air pressure supply (not shown) and is so formed that its inner end 259 registers with the innermost circle of ports 252, one at a time, so that air is supplied to the pipes 245 and thence to the blow-heads for the purpose brought out in my patent above identified. The adjustable valve plate 247 is formed with a series of relatively large diameter ports 260 extending through an angle of approximately 180° and corresponding substantially to the arrangement of the ports 255 in the stationary distributor ring 246. These ports 260 open into a downwardly facing channel 261 in said valve plate. The stationary cap plate 248 is provided with inlet ports 262 which in turn are connected to two pipes 263 leading to a source of supply of air under pressure (not shown). An annular channel 264 in the lower side of the cap plate 248 provides for continuous communication between said ports 262 in the cap plate and the vertical ports 260 in said valve plate.

In view of the above, it is apparent that air under pressure flows from the pipes 263 to the channel 264 and thence to the ports 260 and into the arcuate channel 261. From this channel 261 the air passes through the ports 255 and by way of the outermost circle of ports 252, to the pipes 242 which are connected to the blow-heads. By adjusting the position of the valve plate 247, the point at which the final blowing operation begins, may be regulably controlled. For example, by moving the valve plate counter-clockwise, the beginning of the blowing operation will be advanced and the final blowing operation as a whole, lengthened. On the other hand, movement of the valve plate in a clockwise direction will retard the time of beginning the final blow. For the purpose of adjusting the valve, a sector gear 265 is formed on its periphery and operatively engaged with a pinion 266 at the lower end of shaft 267, the latter having driving connection with a manually operable adjusting rod 268 by way of a worm gear 269 and worm 270.

Driving mechanism

The machine as a whole is driven by means of an electric motor 271 or the like, operating through a speed reducing unit 272 of conventional or any preferred form, the latter driving a shaft 273 and operating through an automatic clutch 274 of standard construction to drive another shaft 275. This latter shaft 275 carries a worm 276 meshing with a worm gear 277 at the lower end of a shaft 278 to which is connected a pinion 279 running in mesh with the ring gear 39 on the blank mold table.

Figures 7, 8:
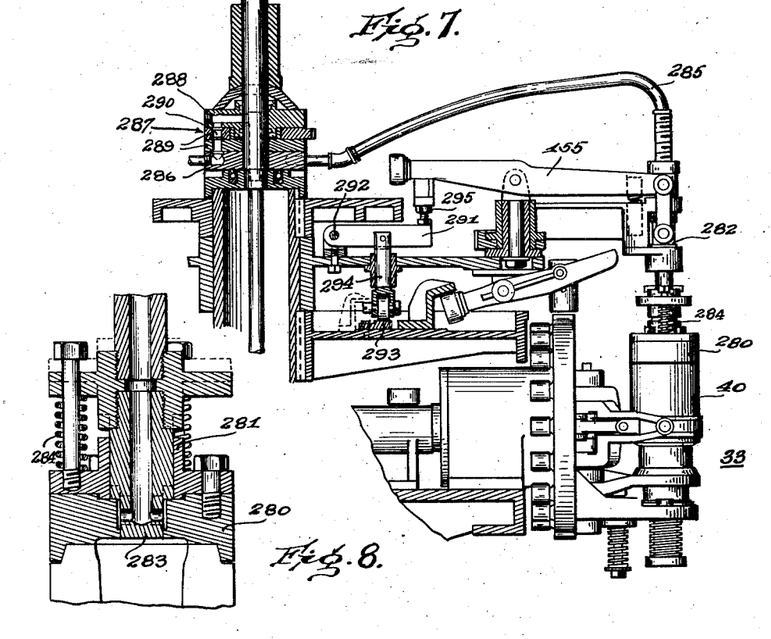
Fig. 7 is a fragmentary sectional elevational view of one of the blank mold groups and a portion of the blank mold column, being a modification to the extent that it includes means for introducing air under pressure into the charging end of the mold.
Fig. 8 is a detail sectional view of one of the baffle plates for the blank molds.

In Figs. 7 and 8 there is illustrated, means whereby a puff of air under pressure may be introduced into the charging opening of the blank mold following the charging operation, for the purpose of positively compacting the glass in the neck mold and about the plunger or mouth-forming pin. The structure involved consists of a baffle plate 280 and an extensible connector 281 between said plate and a holder 282, the latter corresponding substantially to the holder 143 shown in Fig. 4. The connector 281 includes a valve 283 which is opened when the connector occupies its maximum extended position and is adapted to be closed by continued downward movement of the holder 282 following seating of the baffle plate 280 upon the blank mold 40. Spring devices 284 operate to yieldingly hold the connector 281 in its maximum extended position. Air conduits 285 individual to the baffle plates 280, connect them to a rotary distributor ring 286 constituting part of an air distributor 287, the latter including a stationary distributor ring 288 and intermediate rings 289 or plates in which vertical ports 290 are formed for the purpose of establishing communication between an air chamber in the stationary ring 288 and the rotary ring 286. In the modification shown in Figs. 7 and 8, the lever 155 is rocked about its horizontal pivot by means including a pivoted arm 291 connected to a hinge pin 292 and adapted to be oscillated about said pivot pin by a cam 293 operating through a pin 294 which is suitably connected to the arm 291. The inner end of the lever 155 carries an adjustable pin 295 which engages the outer end of the arm 291, so that the lever 155 may be accurately moved under the control of the cam 293, first to seat the head or baffle plate 280 upon the upper end of the mold 40 without relatively moving the baffle plate and valve 283, thus leaving the valve open for the admission of settle blowing pressure into the mold. Subsequent to the completion of the settle blowing and when it is desired to expand the blank into contact with the baffle, the cam 293 causes a further downward movement of the holder 282 through lever 155 to close the valve 283 by bringing the parts to the position shown in Fig. 8 and thus to complete the baffle against which the glass may be expanded by the counter-blowing pressure admitted as above described.

Claims directed to the novel provisions herein disclosed for opening and closing blank and/or final blow molds are not included in the present case, as this subject matter has been divided out and is disclosed and claimed in a copending application, Serial No. 138,283, filed April 22, 1937, which is a division of the present application.

In view of the foregoing, it will be understood that a blank or parison which is suspended from a neck mold at the blank transferring zone between the two mold tables (as stated heretofore) is immediately enclosed in one of the finishing molds and that such operation is followed by complete opening of the corresponding neck mold. Thereafter one of the blow-heads is brought into engagement with the top surface of the finishing mold. At a predetermined variable time, air under pressure is supplied through the pipe 242 to the blow-head and thence to the blank or parison by way of the initial blow opening in the neck end thereof. Just prior to opening of the blow mold preparatory to removal of the finished article, a puff of air is applied to the interior of the upper end of the blow-head to thereby force the valve member and disk at the lower end thereof into holding engagement with the neck end of the finished article. This serves to hold the finished article in an upright position on the bottom plate during removal of the finishing mold sections from contact with the glass.

Modifications may be resorted to within the spirit and scope of the appended claims.

I claim:

1. In a glassware forming machine, the combination of blank and finishing mold tables arranged side by side for rotation about separate vertical axes, an annular series of blank mold units on the blank mold table, each unit including partible body blank and neck molds, an invertible carrier for each blank mold unit, mechanism for inverting the carrier through an angle of 180° about a horizontal axis extending radially of the table to thereby place the blank mold in position to receive a mold charge of molten glass prior to entering a charging zone, locking means for releasably holding the carrier and blank mold unit in either of its two positions, cooperating devices respectively carried by the blank mold unit and said locking means for opening the neck mold during a blank transfer operation, an annular series of finishing molds mounted upon the finishing mold tables and means for transferring blanks from the blank mold units to the finishing molds.

2. In a glassware forming machine, a body blank mold, a baffle plate for closing one end of said mold, means for moving said baffle plate to and from a position closing said mold, means including a valve for controlling the supplying of air under pressure through said baffle plate, means tending to hold said valve in position to permit flow of air through said baffle plate, and means including said baffle plate moving means for closing said valve subsequent to the seating of said baffle plate on said mold.

3. In combination, a mold carriage, a blank mold unit thereon including partible cooperating body blank and neck molds, a rotary carrier for said molds mounted for inversion on said carriage, mechanism for locking the carrier against inversion in either of two operating positions, neck mold opening mechanism, and a common means constructed and arranged to operate the last two named mechanisms.

4. In a glassware forming machine, a mold carriage mounted for rotation about a vertical central column, an annular series of blank molds on said carriage, plunger mechanism individual to the molds, said plunger mechanism including passageways through which air under pressure and vacuum may be applied to the mold in alternation, a pivoted arm associated with each blank mold, means for swinging said arm and thereby bringing it into engagement with and controlling the operation of the plunger mechanism and means including air and vacuum pipes carried by each arm for supplying air under pressure and vacuum to the plunger mechanism and therethrough to the mold.

5. In a glassware forming machine, a support, a blank mold and a neck mold mounted on said support for inversion in respect thereto, means for inverting said molds, means for locking said molds against inversion, independent means for opening said blank and neck molds, a movable common operating means constructed and arranged to release the inversion locking means at one extreme position of its movement and to actuate the neck mold opening means at the other extreme position of its movement and having an intermediate inoperative position, and means for moving said common operating means between the three positions aforesaid in synchronized time relation to other operations of the machine.

FRANK O'NEILL.